Sept. 12, 1961 K. R. ELDREDGE 3,000,000

AUTOMATIC READING SYSTEM

Filed May 6, 1955 4 Sheets-Sheet 1

INVENTOR,
KENNETH R. ELDREDGE
BY Lyon & Lyon
ATTORNEYS

INVENTOR,
KENNETH R. ELDREDGE
BY Lyon & Lyon
ATTORNEYS

AUTOMATIC READING SYSTEM

Filed May 6, 1955 4 Sheets-Sheet 3

INVENTOR,
KENNETH R. ELDREDGE
BY Lyon & Lyon
ATTORNEYS

Sept. 12, 1961 K. R. ELDREDGE 3,000,000

AUTOMATIC READING SYSTEM

Filed May 6, 1955 4 Sheets-Sheet 4

INVENTOR,
KENNETH R. ELDREDGE
BY Lyon & Lyon
ATTORNEYS

United States Patent Office 3,000,000
Patented Sept. 12, 1961

3,000,000

AUTOMATIC READING SYSTEM

Kenneth R. Eldredge, Palo Alto, Calif., assignor, by mesne assignments, to General Electric Company, New York, N.Y., a corporation of New York
Filed May 6, 1955, Ser. No. 506,598
21 Claims. (Cl. 340—149)

This invention relates to apparatus for reading characters in human language and providing therefrom signals representative thereof in machine language.

One of the difficulties blocking the extensive utilization of automatic data-processing machines, is that of providing the information on which such machine is to operate in a form wherein it can be rapidly transferred into the machine from the original documents on which the information exists in human language. By "human language" is meant the well-known printed or written characters by which human beings communicate with one another on paper. Specifically, the term "human language character" means a figure that conveys information, or is recognizable, from its shape and orientation; such as figures having the shapes of letters of the alphabet, numerals, punctuation marks, etc. Figures classed as human language characters are to be distinguished from permutations and combinations of groups of key elements employed to convey information; such as Morse codes, punched paper tape codes, etc. Presently known techniques for transferring the data contained on bills or inventory sheets, for example, requires that this information be either punched as holes in cards, or as holes in paper tape, or be written magnetically in coded form on magnetic tape. Any one of these can then be fed by means of suitable input devices to an automatic data-processing machine. The requirement that the human language has to be read and transcribed to a form suitable for input to a machine, which may be called machine language, interposes a large source of potential errors made by the transcribers, besides being tedious and time wasting. Some schemes have been proposed for printing the data in human language simultaneously with machine language coding, but this arrangement is space wasting and requires new, expensive equipment for its accomplishment.

An object of this invention is the provision of apparatus for converting human language into machine language without the intervention of human readers and transcribers.

Another object of the present invention is to provide a novel arrangement for detecting the distinguishing characteristics of characters in human language and converting these to machine language.

Still another object of the present invention is the provision of a method and means for converting human language to machine language without requiring extensive alterations in writing equipment.

Some early attempts at "automatic reading" may be considered to have been made by devices known as "optiphones" or reading aids for the blind. These devices would convert letters which have distinguishing characteristics in the form of dots, dashes, or letter configurations which would fall into certain areas of a scanning device. The scanning device would then convert the detected information into a form suitable for the blind to interpret—that is, either tactile or audible. None of these apparatuses, however, proved suitable for utilization in converting human language to machine language.

A further object of this invention is the provision of a novel, useful, and simple method and apparatus for converting human language into a form from which suitable utilization by automatic devices may be made.

These and other objects of the present invention are achieved by writing the characters which are to be converted into machine language with a writing material having magnetic properties. Such a writing material may be a magnetic ink, which is described and claimed in an application by Charles B. Clark for Magnetic Ink, filed February 8, 1955, Serial Number 486,985, or a Magnetic Transfer Paper, by Maurice Adler, filed March 7, 1955, Serial Number 492,787, both applications being assigned to a common assignee. Both of these applications are now abandoned. When characters written with a magnetic writing material are magnetized and then passed in sequence under a magnetic reading head, it can be shown that the output obtained from the reading head for each character is a signal having a wave shape or envelope which is characteristic of the character being scanned by the head. Suitable recognition apparatus is employed which senses a characteristic wave shape and converts it into a code number which is suitable for subsequent utilization by automatic data-processing machinery. There are two embodiments of the recognition apparatus described herein, although it will be readily realized that these are illustrative and not to be taken as limiting.

In one embodiment, the output of the reading head is passed through a delay line. When the entire signal is within the delay line, the amplitude of the signal at various significant (from the standpoint of distinguishing between wave shapes) positions are sampled. The maximum one of these amplitudes is determined. A portion of this maximum amplitude is employed in such a manner so that further amplification is made only of those sampled amplitudes which exceed this portion of the maximum amplitude. Since each one of the sampled portions is preserved in what may be considered as its own channel, the last step provides a voltage pattern akin to an electrical representation of a binary number. This binary number differs for each characteristic wave shape and, thereby, is representative of the different characters. The subsequent utilization apparatus in the form of data-processing machines, automatic sorting machines, and the like, usually require binary-coded data as input, and, accordingly, the characters have been converted from human language to a form utilizable by the machine or machine language.

The magnetization of the characters may be accomplished by using direct current in a magnetic-writing head or by a permanent magnet. It also may be an "alternating-current" magnetization, which may be accomplished, for example, with another magnetic-writing head, to which a constant-amplitude alternating current is applied as the characters written in the magnetic ink are passed thereunder. In the latter case, the output of the reading head is rectified and passed through a filter before being applied to the delay line. Thus the signal is demodulated.

In a second embodiment of the invention, a permanent magnet is employed to magnetize the characters written with a magnetic material. The characters are successively passed over a permanent magnet for direct-current magnetization. They are then passed under a reading head. The signal detected is then amplified, clipped, and applied to a delay line. The presence or absence of a signal at predetermined points along said delay line is then detected by suitable circuits, such as flip-flops. The output voltage pattern of the group of flip-flops after such sampling is a coded representation of the character. This can be employed directly for machine input, or converted electrically into another desired code form.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1, by way of illustrating this invention, shows the numerals 0 through 9 and the associated characteristic wave shapes obtained when these numerals are printed with magnetic-writing material, A.C. magnetized, scanned in the horizontal direction by a magnetic-reading head, and then demodulated;

Figure 1:
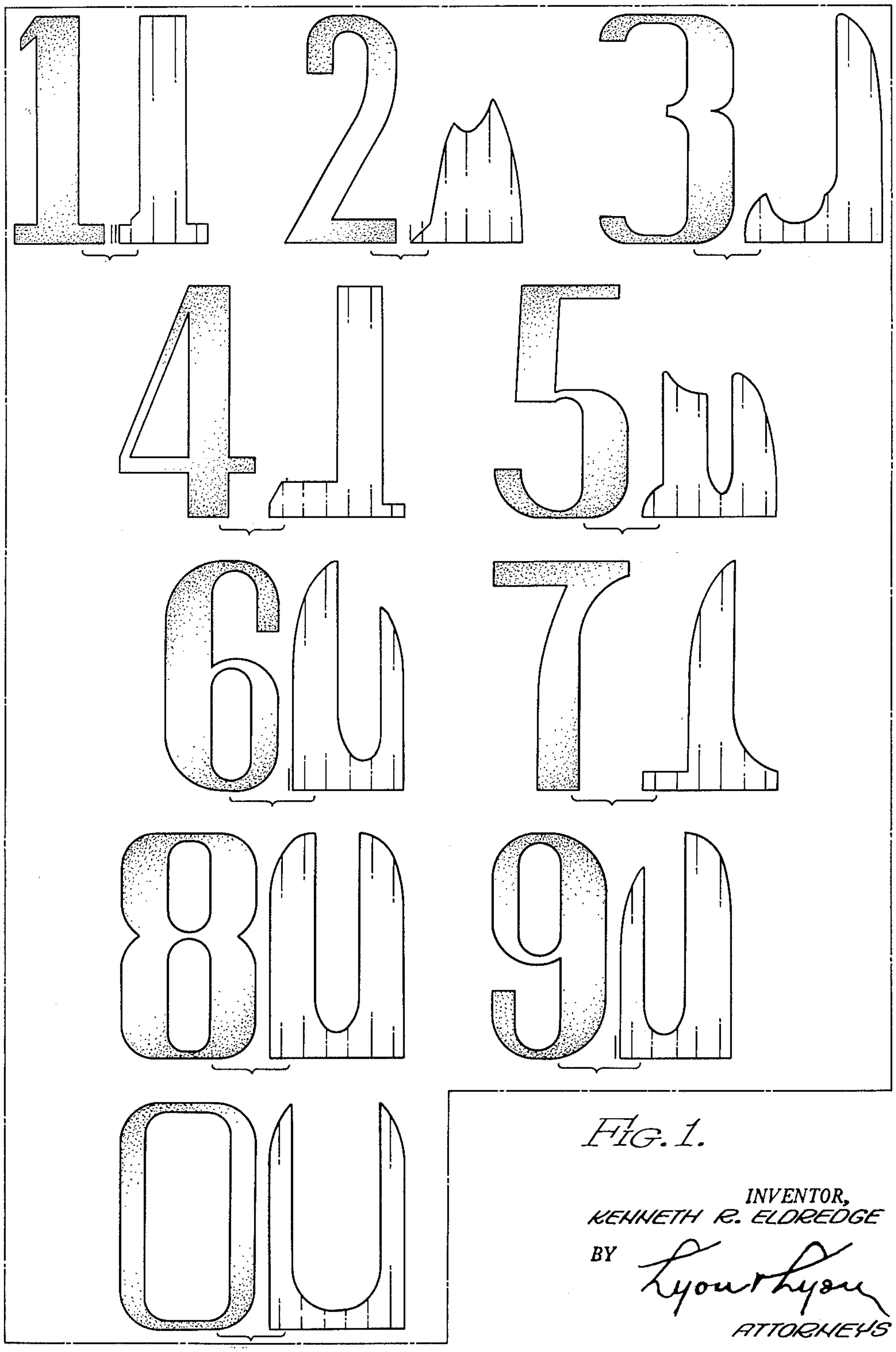

In FIGURE 1, the numbers 0 through 9 were printed in human language. The principles described here apply equally well to letters, but numbers are shown by way of illustration. Magnetic ink, the magnetic-writing material, was used in the printing thereof. Magnetic ink is described and claimed in the previously noted application of Charles B. Clark. The ink consists of a vehicle having suitable consistency to support a pigment which has magnetic characteristics. The preferred pigment is one which has a substantial remanence. The numbers were magnetized employing alternating-current magnetization and were then passed under a magnetic-reading head. Although most standard numerals can be employed for the purposes to be described, the numerals shown were designed to provide particularly distinctive wave shapes for each number when passed under a magnetic-reading head. The output signal from the reading head was then demodulated. It will be seen that the resultant wave shapes which are shown accompanying each number are different from one another. In accordance with one embodiment of this invention, samples at various points of detected wave shape are taken. These samples are then corrected for variations in the over-all amplitude due to the variations in printing and then are passed through an amplitude discriminator which establishes a pattern of voltages corresponding to a binary-code number representative of the wave shape and/or character from which it is derived. It should be appreciated that the location of the places at which the sample points are chosen can also assist in distinguishing between the wave shapes. To this end the sample-point locations are selected at the points where the greatest distinctions between the different wave shapes exist. The vertical lines passing through the various wave shapes shown in FIGURE 1 indicate favored positions for such sample points.

After a character is written in human language with magnetic ink, it may then be magnetized either by a permanent magnet or an alternating-current magnet. The character is then moved past a magnetic-reading head which provides as an output a signal, the wave shape of which is characteristic of the character being scanned. The use of the alternating-current magnetization requires a process akin to demodulation of a radio signal, since, in that case, the output of the magnetic-reading head is an alternating signal, amplitude-modulated by the variations in height of the magnetic mark. The characteristic wave shape may then be recognized by converting it to a binary-code number.

Figure 2:
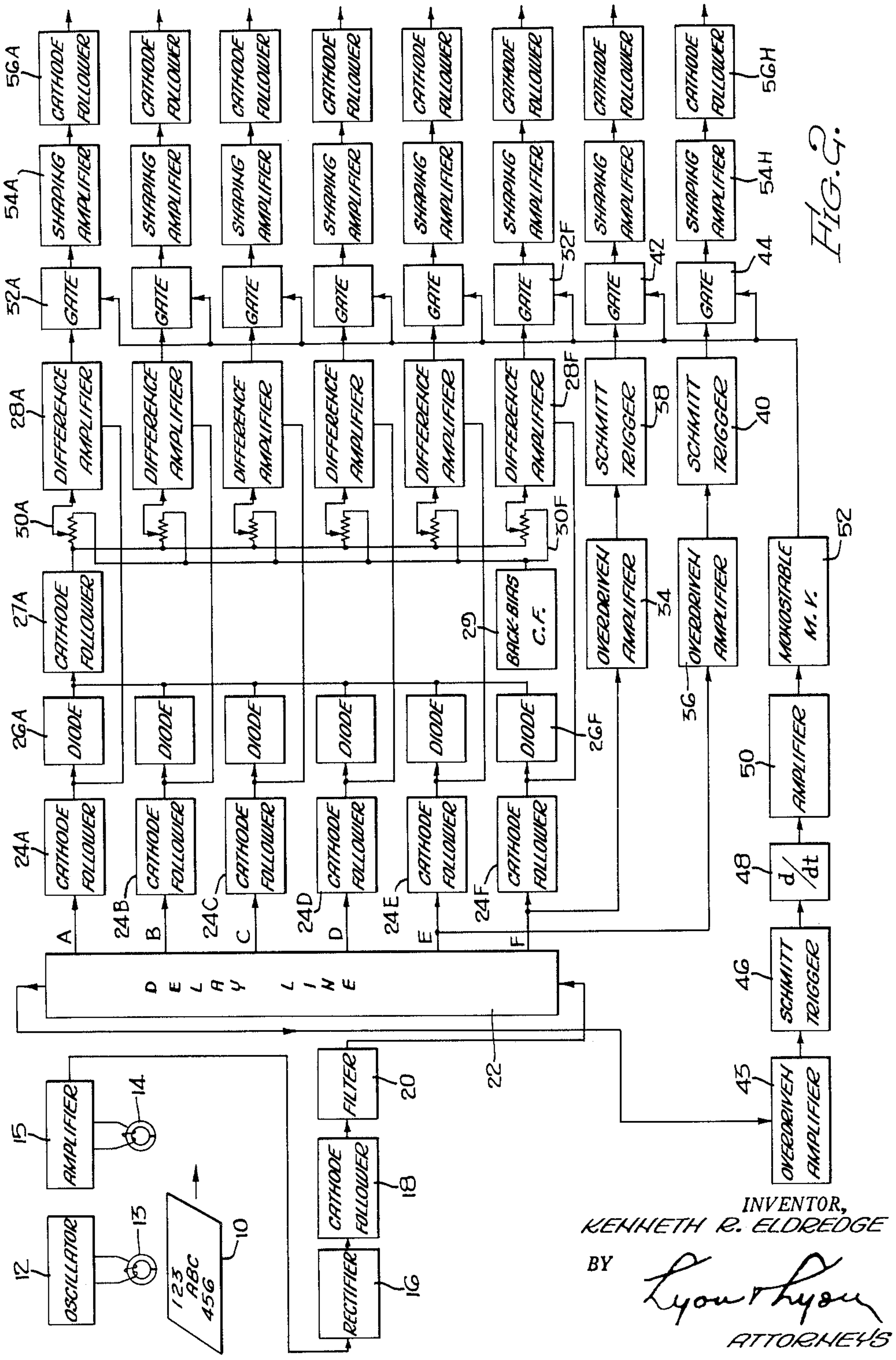
FIGURE 2 is a block diagram of an embodiment of the invention.

Referring now to FIGURE 2, there may be seen a block diagram of an embodiment of the invention. A document 10, moving on suitable conveying apparatus (not shown), has characters written thereon in magnetic ink. The characters are preferably of the type shown in FIGURE 1. These are passed under a write station, which includes an oscillator 12 and a writing head 13. This head may be a magnetic-writing head of the type employed with a magnetic tape or drum. It is driven by an oscillator where it is desired that the magnetization be of the alternating-current type. This type of magnetization is preferred here, since the signal-to-noise ratio of the subsequently detected signal is maximized. However, the invention can operate satisfactorily if direct-current magnetization of the characters is employed. The document on which the letters or numbers appear may be carried on a conveyor system so that the lines of writing are passed sequentially under the write station and then under a reading station. This reading station includes a reading head 14 and amplifier 15. The reading head is of the type employed in reading from magnetic tape or drum. A writing head may be provided to magnetize each line to be read. A reading head may be provided to read each line. Proper sequencing may be obtained by staggering the positions of the heads so that as the paper moves its writing is read, line by line. Alternatively, the output of parallel reading heads may be stored on magnetic tape, for example, and then subsequently read out in any desired sequence.

It should here be noted that the magnetic-reading head and the magnetic-writing head both are positioned so that their gaps extend transversely to the motion of the letter passing thereunder. Furthermore, the length of the gap should be greater than the size of the characters passing thereunder, so that an entire character passes the gap and not just a portion thereof. The reading may occur using any desired angle of approach between the character to be read and the head, providing the remainder of the recognition apparatus has been calibrated to detect the characteristic wave shape generated by such angle of approach. Once the angle of approach has been selected, variations in this angle may be eliminated by well-known apparatus for aligning paper sheets or, for example, by employing marks which can be sensed for the purpose of properly orienting the document to have the desired angle of attack.

In any event, when a character passes underneath a reading head, a voltage is induced in its output coil in well-known fashion by virtue of the number of lines of flux changing as the character moves underneath the head. The voltage is closely proportional to the height of the written mark which is under the reading head or gap and is also proportional to the magnetic intensity applied at the writing station. The resulting output signal is a modulated carrier signal having the frequency of the write oscillator. The alternating or carrier signal is amplitude modulated by the variations in height of the magnetic mark. The output of the reading head is amplified by amplifier 15 and is then applied to a full-wave rectifier 16. The output of the rectifier is then applied to a cathode follower 18 for buffering and it is then applied to a following low-pass filter 20. The output of the filter is the modulating signal from which the carrier has been suppressed. This signal has an envelope, or wave shape, which may be, for example, one of those shown in FIGURE 1. The wave shape, of course, is the one derived from the number which has been passed under the reading head.

The output of the filter is then applied to a delay line 22. The delay line may be any of the well-known types which can delay an entire signal and yet substantially preserve its wave shape. For example, a suitable delay line is the artificial transmission line described on pages 353 et seq. of High-Speed Computing Devices, by Engineering Research Associates, Inc., and published by the McGraw-Hill Book Company. Another delay-line apparatus is a magnetic drum, or endless magnetic tape loop. The signal is recorded on these and then repeatedly displayed on a cathode-ray tube screen. It may also be held in a storage tube such as the "Graphechon" which is described in the RCA Review for March 1949 by L. Pensak. The delay line has a time delay sufficient to enable the entire signal to be contained therein. At a number of sampling points along the delay line, the amplitude of the signal contained therein is detected. Suitable sampling points which are at the same relative position for each number are shown on the wave shapes in FIGURE 1. With the magnetic or tube storage, the sampling at the various points may be made in sequence and repetitively and is made so rapidly as to be substantially simultaneous as far as the subsequent circuitry operation is concerned. Each of these sample points is connected to a separate one of the cathode followers 24A through 24F, which serve as buffers. There are six sampling points illustrated. More or less may be chosen if required. The output of each cathode follower is applied to a subsequent associated diode 26A through 26F and to one input of an associated difference amplifier 28A through 28F. The difference amplifier or comparator is an amplifier circuit which amplifies the excess of input signal over a reference potential. These circuits are well known and are shown, for example, on pages 359 et seq. of Waveforms, by Chance et al., published by the McGraw-Hill Book Company. The diodes all have the same one of their electrodes connected together and to a cathode follower 27. With this arrangement, the signal applied to the cathode follower 27 has the maximum amplitude of the signal which has been detected in the delay line. The output of this cathode follower is applied to one side of six bias potentiometers 30A through 30F. A second cathode follower 29, also called a back-bias cathode follower, is connected to the other side of the six bias potentiometers. The back bias cathode follower is biased to be at the same quiescent state as is the cathode follower 27, before any signal is applied thereto. The back bias cathode follower serves as a ground return for the bias potentiometers. The variable arms of the bias potentiometers are each connected to the difference amplifiers to supply the required reference voltage. With this arrangement, the potentiometers serve to adjust the dynamic signal level for the difference amplifiers without affecting the quiescent, or D.C., level. The output of the buffer cathode follower 27 is attenuated by means of the potentiometers 30A through 30F. Thus, when the cathode follower 27 conducts, it provides a dynamic reference voltage to each of the difference amplifiers. Only a signal in excess of this reference voltage is amplified by the respective difference amplifiers. Therefore, each one of the difference amplifiers 28A through 28F will provide an output only when the signal received from the respective cathode followers 24A through 24F exceeds an assigned fraction of the maximum amplitude signal obtained from the buffer cathode follower 27.

The outputs of the difference amplifiers are applied to gates 32A through 32F. These gates are normally closed, i.e., closed in the quiescent condition. They require two simultaneously present inputs in order to be opened. These gates are coincidence gates and suitable types are shown and described in Chapter 4 of the book High-Speed Computing Devices, previously mentioned. The second required input is derived from the delay line through intervening apparatus.

In addition to the six signals obtained from the outputs of the differential amplifiers, which are "present" if they exceed the value established by the peak signal and potentiometers, or "absent" if they do not exceed this value, two more signals are derived from two of the six sampling points which may be termed "signal-present" signals. These two sampling points are respectively connected to two "overdriven" amplifiers 34, 36. These are merely high-gain amplifiers which sharpen up the leading and trailing edges of any applied wave shape. These amplifiers are used to drive two Schmitt trigger circuits 38, 40. These are trigger circuits which are driven from a first to a second stable state as long as the input exceeds a preset voltage value. These trigger circuits are well known and are described in an article by O. H. Schmitt, entitled A Thermionic Trigger, in the Journal of Scientific Instruments, vol. 15, pp. 24–26, January 1938. The outputs of the Schmitt circuits are applied to gates 42, 44. These are the same as gates 32A—32F and have the same second required input as those other gates. Thus, eight signals are applied to the eight gates. These eight signals form a unique voltage pattern for each unique wave shape in the delay line.

The eight gates are "strobed" or opened for a sampling interval. When the leading edge of a signal reaches the end of the delay line, indicating that the complete signal is contained therein, an "overdriven" amplifier 43 senses this. The output of the amplifier is used to drive another Schmitt trigger circuit 46. The output pulse of the Schmitt trigger circuit is differentiated by the differentiating circuit 48. The output of the differentiating circuit is amplified by amplifier 50. This, then, is used to drive to its unstable state a monostable multivibrator 52. This is a flip-flop circuit which has a single stable state and an unstable state. The time the circuit remains in its unstable state is a function of the time constants of the circuit. The output of this multivibrator thus serves as a time-sampling input to all the gates 32A—32F, 42, and 44. These gates are then all enabled to pass any outputs received from the difference amplifiers and Schmitt trigger circuits for the time the monostable multivibrator remains in its unstable state. The gate outputs are applied to associated shaping amplifiers 54A through 54H. The shaping amplifiers serve to shape into more rectangular form any input signals applied thereto. Their outputs are applied to succeeding cathode followers 56A through 56H. These are buffer and impedance conversion circuits. Their outputs are all applied to subsequent utilization apparatus.

The cathode-follower outputs thus also present a voltage pattern which is an eight-digit binary code representation of a character which has passed under the magnetic-reading head. The code is binary since it signifies intelligence by the presence or absence of a signal in each digit position. For the numbers shown in FIGURE 1, the following is the binary code or voltage pattern obtained:

| | A | B | C | D | E | F | (E) | (F) |
|---|---|---|---|---|---|---|---|---|
| 1 | 0 | 1 | 1 | 0 | 0 | 0 | 0 | 0 |
| 2 | 1 | 1 | 1 | 1 | 0 | 0 | 1 | 0 |
| 3 | 1 | 1 | 0 | 0 | 0 | 0 | 1 | 1 |
| 4 | 0 | 1 | 1 | 0 | 0 | 0 | 1 | 1 |
| 5 | 1 | 1 | 0 | 1 | 1 | 0 | 1 | 1 |
| 6 | 1 | 0 | 0 | 1 | 1 | 0 | 1 | 0 |
| 7 | 0 | 0 | 1 | 1 | 0 | 0 | 1 | 1 |
| 8 | 1 | 1 | 0 | 0 | 1 | 1 | 1 | 1 |
| 9 | 1 | 1 | 0 | 0 | 1 | 0 | 1 | 0 |
| 0 | 1 | 0 | 0 | 0 | 0 | 1 | 1 | 1 |

The letters A through F correspond to those shown at the sampling points of the delay line. The 1's represent the presence of a voltage pulse and the 0's the absence. The columns (E) and (F) represent the two "signal present" output signals for each character. The cathode-follower outputs are all applied to a utilization apparatus which may be a code converter, or storage apparatus, or subsequent sorting apparatus, which operates on the paper from which a reading has been taken. In any event, this embodiment of the invention illustrates how, from a character written with magnetic ink in human language, a wave shape is derived, is sampled, and a code or machine language is obtained therefrom.

Figure 3:
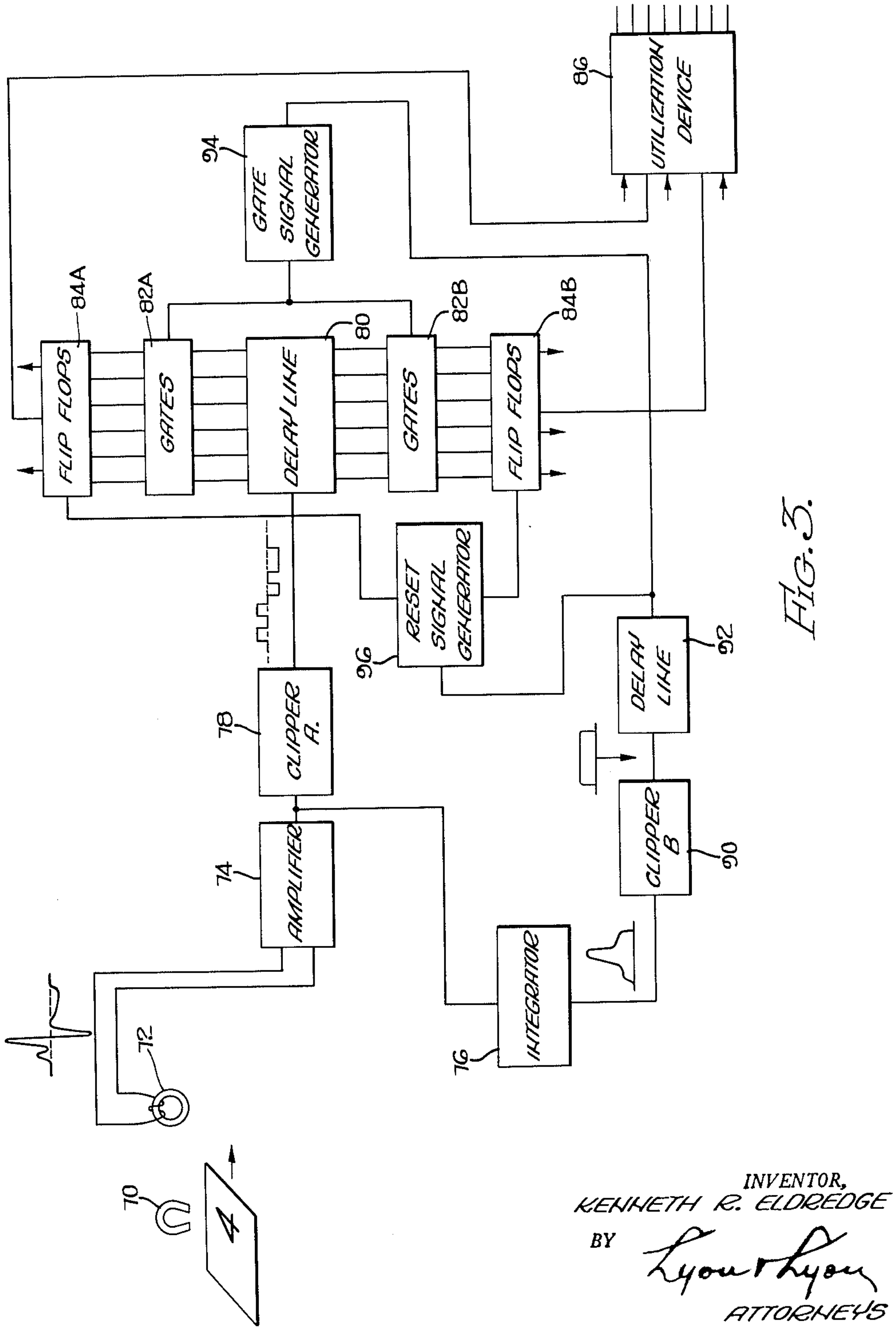
FIGURE 3 shows a second embodiment of the invention.

FIGURE 3 shows a block diagram of another embodiment of the invention. In this embodiment of the invention, direct-current magnetization of the characters which are written is employed. A writing station can thus consist of a permanent magnet 70. The paper containing the characters to be magnetized is passed in proximity to this magnet. The paper is then passed under a reading head 72 in substantially the same manner as described previously. The signal derived is applied to an amplifier 74. The amplifier output is then applied to an integrator 76 and to a clipper 78. If desired, the permanent magnet 70 can be positioned opposite the reading head. The paper with the characters written thereon in magnetic ink is passed between them. The head then reads variations in reluctance in the air gap as each magnetic-ink written character is moved into it, but the resultant output wave shape is substantially the same. An ink with a "magnetically soft" pigment can be used here, as well as one with a magnetically hard pigment.

Figure 4:
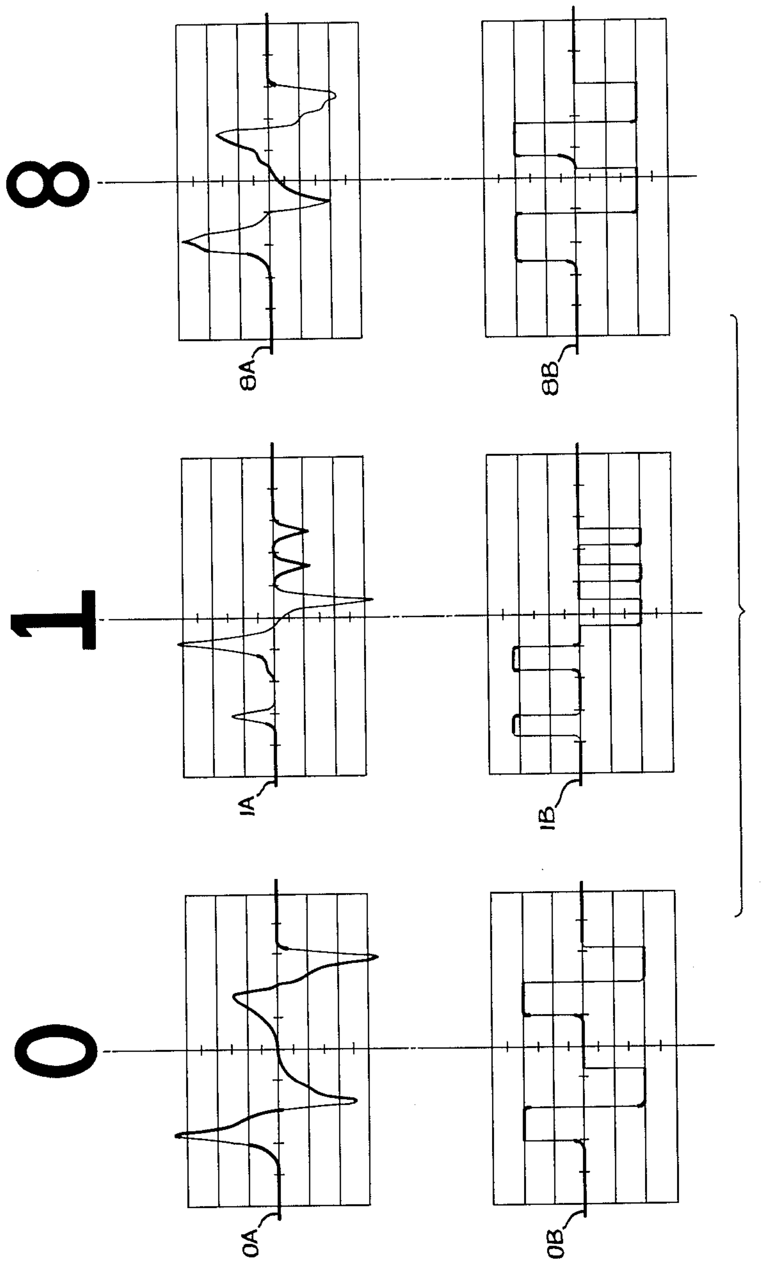
FIGURE 4 shows, by way of example, the numbers 0, 1, and 8, and the associated wave shapes, when these are written with magnetic-writing material, D.C. magnetized, and then scanned by a magnetic-reading head.

FIGURE 4 represents a few of the wave shapes obtained by scanning, for example, the numbers 0, 1, and 8. 0A, 1A, and 8A, respectively, represent the wave shape of the signals obtained at the output of the reading head. 0B, 1B, and 8B represent the signal wave shapes after they have been amplified and clipped. These wave shapes are drawn against the same time scale. The originally generated signal has been converted into a signal consisting of a train of positive and negative pulses which are characteristic of each character. It will be seen that they are distinctive. The output of the clipper 78 is applied to a delay line 80 which may be one of the types previously mentioned in connection with FIGURE 2. The various points of the signal wave shape in the delay line are sampled to determine whether or not a voltage is present. Individual flip-flops 84A and 84B sense the presence or absence of a positive or negative voltage at each sampling point through individual gates 82A and 82B. Flip-flops 84A are each sensitive to positive voltages; flip-flops 84B are each sensitive to negative voltages. Therefore, they are tripped or not, in accordance with the signal waveform present in the delay line. Thus, the voltage pattern established by the outputs of all the flip-flops can be said to represent in machine language the character which is read by the magnetic-reading head. The outputs of all the flip-flops are applied to subsequent code conversion or utilization apparatus in the manner described previously.

For triggering or opening the gates 82A, 82B, the output of the integrator 76, which is a wave shape which resembles that obtained after demodulating the signal from an alternating-current magnetized character, is applied to a clipper 90. This squares off the signal so that it is substantially a rectangle having the substantial duration of the signal being applied to the delay line 80. The clipper output is applied to a delay line 92. This delay line is similar to the other and has the same delay period. When the front end of the signal reaches the end of the delay line 92 or any desired point therein as dictated by circuit time constants, a gate-signal generator 94 is actuated to provide a signal which permits the gates 82A, 82B to open for sampling the signal in the delay line 80. The gate signal generator 94 may include the same apparatus employed for time sampling which is shown in FIGURE 2. The output of the delay line 92 is also applied to a reset-signal generator 96. This provides as an output a pulse which resets all the flip-flop circuits to the same initial sensing condition. The reset-signal generator is actuated by the end of a signal as it leaves the delay line. This can be readily achieved in well-known manner, for example, by employing the aforementioned sampling circuit but inserting a rectifier after the differentiating circuit which is poled to provide an output only in response to a negative-going wave. This is provided by the differentiated trailing edge of the Schmitt trigger output which occurs when the delay-line output begins to drop. The flip-flops are thus reset after a character has been sensed and are in readiness for the next character.

There has thus been described and shown herein a system and method for converting human language to machine language by writing the human language in magnetic ink, magnetizing the human-language characters, generating an electrical wave shape distinctly representative of the magnetized character, sampling the wave shape at several points, and generating a code representation from the samples. The letter scan or pass is made only once, thus simplifying the scanning procedure. Other types of recognition apparatus for a character-representative wave shape than the ones described herein may be employed and yet be within the present inventive concept. For example, cathode-ray tubes may be employed with wave-shape matching masks, departures from which are sensed by photocells to thus identify the mask from which there is no departure. Other variations may occur to those skilled in the art and still be within the purview of the present invention. For example, more than one magnetic head may be used to scan a character from different directions, each of which provides a different unique wave shape for that character, thus enabling cross checking or character identification from the wave shape providing the most easily identifiable characteristics.

I claim:

1. A system for converting a character written in magnetic ink in human language to machine language comprising means to magnetize said character, a magnetic reading head, means to move said character under said magnetic reading head, means to obtain a signal from the output of said reading head having a wave shape characteristic of said character, a delay line, means to apply said signal to said delay line, means to detect the amplitude of said signal at several predetermined sampling points along said delay line, means to detect the maximum one of said detected signal amplitudes, means to amplify only the ones of said detected signal amplitudes which exceed a predetermined portion of said maximum detected signal amplitude to obtain a voltage pattern representative of said character.

2. A system as recited in claim 1 wherein said means to amplify only the ones of said detected signal amplitudes which exceed a predetermined portion of said maximum detected signal amplitude includes a plurality of difference amplifiers one for each sampling point, means to apply said desired portion of said maximum signal amplitude to one input of all said difference amplifiers, and means to apply a different one of said signal amplitudes to another input of each of said difference amplifiers to provide output from those of said difference amplifiers wherein said input to said another input exceeds that to said one input.

3. Apparatus for recognizing each of a plurality of different characters written on a document in magnetic ink in form adapted to be recognized by the human eye in accordance with the respective shapes and orientations of the written character, wherein the whole portion of each of said characters is written with magnetic ink, each of said characters comprising a continuous distribution of magnetic ink on said document, said apparatus comprising magnetizing means to subject each of said characters to a common magnetic field configuration for magnetizing the entire magnetic ink distribution of each of said characters, magnetic reading means for sensing the magnetic field configuration of each of said characters and in response to said field configuration for delivering an output representative thereof, and identification means responsive to said output for providing a corresponding one of a plurality of signal patterns representative of the character sensed by said reading means.

4. Apparatus for recognizing each of a plurality of different characters each comprised of a continuous distribution of magnetically and optically distinguishable material on the surface of a substance having physical properties permitting such distinction, in which the areas of distinctive magnetic and optical properties are coterminal, each of said characters conveying information by its shape and orientation, comprising magnetizing means to subject each of said characters to a common magnetic field configuration for magnetizing the entire magnetizable material of each of said characters, magnetic reading means for sensing the magnetic field configuration of each of said characters and in response to said field configuration for delivering an output representative thereof, and identification means responsive to said output for providing a corresponding one of a plurality of signal patterns representative of the character sensed by said reading means.

5. Apparatus for recognizing each of a plurality of different characters written on a document in magnetic ink in form adapted to be recognized by the human eye in accordance with the respective shapes and orientations of the written character, wherein the whole portion of each of said characters is written with magnetic ink, each of said characters comprising a continuous distribution of magnetic ink on said document, said apparatus comprising magnetizing means to subject each of said characters to a common magnetic field configuration for magnetizing the entire magnetic ink distribution of each of said characters, a magnetic reading head adapted to sense a magnetic field and in response thereto to deliver an output signal representative of said field, means for exposing said head to each of said characters subjected to said magnetizing means, whereby said head delivers an output signal characteristic of the character sensed thereby, identification means for providing any one of a plurality of different signal patterns in response to a corresponding one of a plurality of different input signals, and means for applying said output signal to said identification means.

6. Apparatus for recognizing each of a plurality of different characters written on a document in magnetic ink in form adapted to be recognized by the human eye in accordance with the respective shapes and orientations of the written character, wherein the whole portion of each of said characters is written with magnetic ink, each of said characters comprising a continuous distribution of magnetic ink on said document; comprising means for magnetizing the entire magnetizable portion of each of said characters, a magnetic reading head adapted to sense a magnetic field and in response thereto to deliver an output signal representing said field, means for providing relative movement between said head and each of said magnetized characters, whereby said head delivers an output wave shape characteristic of the magnetized character sensed, identification means for providing any one of a plurality of different output signal patterns in response to a corresponding one of a plurality of different input wave shapes, and means for applying said output wave shape to said identification means.

7. The combination of a document bearing characters written in form adapted to be recognized by the human eye in accordance with the respective shapes and orientations of the written characters, wherein each character is written as a continuous distribution of magnetic ink adapted to be magnetized and wherein the whole portion of each of said characters is written with magnetic ink, magnetizing means to subject each of said characters to a common magnetic field configuration for magnetizing the entire magnetic ink distribution of each of said characters, and means responsive to the magnetic field induced in each of said characters by said magnetizing means for producing a wave shape characteristic of said character.

8. Apparatus for electrical recognition of each of a plurality of different characters written as a continuous distribution of magnetic ink in form adapted to be recognized by the human eye in accordance with the respective shapes and orientations of the written characters, wherein the whole portion of each of said characters is written with magnetic ink: comprising magnetizing means to subject each of said characters to be recognized to a common magnetic field configuration for magnetizing the entire magnetic ink distribution of each of said characters; a magnetic sensing means; a movable document bearing said characters for causing movement of said characters past said magnetizing means and said sensing means, whereby said magnetizing means first magnetizes said character and said magnetic sensing means then senses the magnetic field provided by said character; said magnetic sensing means being responsive to the entire magnetic field of the character in a dimension transverse to the direction of said movement for providing an output signal representing the sensed magnetic field as said character moves past said magnetic sensing means, identification means for providing any one of a plurality of different signal patterns in response to a corresponding one of a plurality of different received signals, and means for applying said output signal to said identification means.

9. Apparatus for reading characters each written as a continuous distribution of magnetic ink, wherein the whole portion of each of said characters is written with magnetic ink; comprising magnetizing means for magnetizing the entire magnetic ink distribution of one of said characters when in proximate relation thereto, a magnetic reading head for providing a signal in response to the magnetic field of a magnetized one of said characters when in proximate relation thereto, means for effecting a proximate relationship between said characters and said magnetizing means and said reading head in succession, identification means for providing any one of a plurality of different output signal patterns in response to a corresponding one of a plurality of different input signals, and means for applying said signal to said identification means.

10. Apparatus for converting characters written in human language with a continuous distribution of magnetic ink to machine language, wherein the whole portion of each of said characters is written with magnetic ink; comprising magnetizing means for magnetizing the entire magnetic ink distribution of each of said characters, a magnetic reading head for providing a signal in response to the magnetic field of a magnetized character, means to move each one of said characters relative to said magnetizing means and said reading head, means to sample different portions of said signal and to deliver a plurality of output signals representing the respective amplitudes of said portions, and means to convert said output signals to a binary coded signal pattern representative of said one character.

11. Apparatus for reading characters written in human language with a continuous distribution of magnetic ink, wherein the whole portion of each of said characters is written with magnetic ink; comprising magnetizing means for magnetizing the entire magnetic ink distribution of each of said characters when in proximate relation thereto, a magnetic reading head for providing a signal in response to the magnetic field of said characters when in proximate relation thereto, means for effecting a proximate relationship between one of said characters and said magnetizing means and said reading head in succession, signal generation means for generating a plurality of different output signal patterns representing respectively said characters, and controlling means responsive to said signal for controlling said signal generation means to generate the one of said patterns corresponding to said one character.

12. Apparatus for reading characters written in human language with a continuous distribution of magnetic ink, wherein the whole portion of each of said characters is written with magnetic ink; comprising a transducer for successively magnetizing the entire magnetic ink distribution and sensing the induced magnetic field of each of said characters, said transducer being adapted to provide a signal in response to the magnetic field of each character sensed thereby, identification means for providing any one of a plurality of different output signal patterns in response to a corresponding one of a plurality of different input signals, and means for applying said signal to said identification means.

13. Apparatus for recognizing each of a plurality of different wave shapes, comprising: means for sampling different portions of each one of said wave shapes and for delivering a plurality of sample signals representing the respective amplitudes of said portions; means for producing a reference signal; a plurality of comparison means, each having first and second input terminals, each of said comparison means being adapted to compare an input signal received at the first input terminal thereof with an input signal received at the second input terminal thereof and to produce a respective output signal representing a binary digit as a result of said comparison; means for applying said reference signal to the second input terminals of all of said comparison means; and means for applying each of said sample signals to the first input terminal of a respective one of said comparison means.

14. Apparatus for reading characters written in human language with a continuous distribution of magnetic ink, wherein the whole portion of each of said characters is written with magnetic ink; comprising magnetizing means for subjecting all of said characters when in proximate relation thereto to a common magnetic field configuration for magnetizing the entire magnetic ink distribution of each of said characters, a magnetic reading head for providing a signal in response to the magnetic field of a magnetized one of said characters when in proximate relation thereto, means for effecting a proximate relationship between said one character and said magnetizing means and said reading head in succession, identification means for providing any one of a plurality of different output signal patterns in response to a corresponding one of a plurality of different input signals, and means for applying said signal to said identification means.

15. A method for transforming data comprising writing with a magnetizable material characters each continuous in magnetizable material distribution and in form adapted to be recognized by the human eye in accordance with the respective shapes and orientations of the written characters, wherein the whole portion of each of said characters is written with magnetizable material; exposing each of said characters to a common magnetic field configuration for magnetizing the entire distribution of each of said characters; and passing each of said characters under a magnetically responsive reading head to obtain electrical wave shapes characteristic of each different character.

16. Apparatus for reading characters written in human language, each comprising a continuous distribution of magnetic ink, wherein the whole portion of each of said characters is written with magnetic ink; comprising magnetizing means for magnetizing the entire magnetic ink distribution of each of said characters when in proximate relation thereto, a magnetic reading means for providing signals in response to the magnetic fields of magnetized characters when in proximate relation thereto, means for effecting a proximate relationship between said characters and said magnetizing means and said magnetic reading means in succession, identification means for providing any one of a plurality of different output signal patterns in response to corresponding input signals, and means for applying said signals to said identification means.

17. Apparatus for converting characters each written in human language with a continuous distribution of magnetic ink to machine language, wherein the whole portion of each of said characters is written with magnetic ink; comprising magnetizing means for magnetizing the entire magnetic ink distribution of each character, a magnetic reading means for providing signals in response to the magnetic fields of the magnetized characters, means to move said characters relative to said magnetizing means and said reading means, means to sample different portions of said signals and to deliver a plurality of output signals representing the respective amplitudes of said portions, and means to convert said output signals to binary coded signal patterns representative of said characters.

18. Apparatus for recognizing each of a plurality of different characters, each comprising a continuous distribution of magnetic ink and written in form adapted to be recognized by the human eye in accordance with the respective shapes and orientations of the written character, wherein the whole portion of each of said characters is written with magnetic ink comprising magnetizing means to subject the entire magnetic ink distribution of each of said characters to an alternating current magnetic field, magnetic sensing means for sensing the magnetic field configuration of each of said characters and in response to said field configuration for delivering an output representative thereof, and identification means responsive to said output for providing a corresponding one of a plurality of signal patterns representative of the character sensed by said sensing means.

19. Apparatus for recognizing each of a plurality of different characters, each comprising a continuous distribution of magnetic ink and written in form adapted to be recognized by the human eye in accordance with the respective shapes and orientations of the written character, wherein the whole portion of each of said characters is written with magnetic ink; comprising magnetizing means for magnetizing the entire magnetic ink distribution of each of said characters with an alternating magnetic field, a magnetic reading means adapted to sense magnetic fields and in response thereto to deliver output signals representative of said field, means for exposing said magnetic reading means to each of said characters subjected to said magnetizing means, whereby said magnetic reading means delivers output signals characteristic of the characters sensed thereby, identification means for providing any one of a plurality of different signal patterns in response to corresponding input signals, and means for applying said output signals to said identification means.

20. The combination of a document bearing characters written in form adapted to be recognized by the human eye in accordance with the respective shapes and orientations of the written characters, wherein each character is written as a continuous distribution of magnetic ink adapted to be magnetized and wherein the whole portion of each of said characters is written with magnetic ink; magnetizing means to subject each of said characters to an alternating magnetic field for magnetizing the entire magnetic ink distribution of each of said characters, and means responsive to the magnetic fields induced in said characters by said magnetizing means for producing wave shapes characteristic of said characters.

21. Apparatus for recognizing each of a plurality of different wave shapes, comprising: first means for sampling different portions of each one of said wave shapes and for delivering a plurality of sample signals representing the respective amplitudes of said portions; a plurality of second means, each of said second means being adapted to receive an input signal at an input terminal thereof, to compare said input signal with a reference signal, and to produce an output signal representing a binary digit as a result of said comparison, wherein said reference signal comprises a predetermined portion of the one of said sample signals having the greatest amplitude; and means for applying each of said sample signals to the input terminal of a respective one of said second means.

References Cited in the file of this patent

UNITED STATES PATENTS

| | | |
|---|---|---|
| 2,258,106 | Bryce | Oct. 7, 1941 |
| 2,403,561 | Smith | July 9, 1946 |
| 2,427,383 | Bryce | Sept. 16, 1947 |
| 2,511,121 | Murphy | June 13, 1950 |
| 2,583,983 | Arndt et al. | Jan. 29, 1952 |
| 2,616,983 | Zworykin et al. | Nov. 4, 1952 |
| 2,641,740 | Levy | June 9, 1953 |
| 2,663,758 | Shepard | Dec. 22, 1953 |
| 2,682,043 | Fitch | June 22, 1954 |
| 2,738,499 | Sprick | Mar. 13, 1956 |
| 2,741,312 | Johnson | Apr. 10, 1956 |
| 2,751,433 | Linger | June 19, 1956 |
| 2,757,864 | Pollard et al. | Aug. 7, 1956 |
| 2,762,862 | Bliss | Sept. 11, 1956 |
| 2,784,392 | Chaimowicz | Mar. 5, 1957 |
| 2,801,334 | Clapper | July 30, 1957 |
| 2,807,005 | Weidenhammer | Sept. 17, 1957 |
| 2,838,602 | Sprick | June 2, 1958 |
| 2,846,666 | Epstein | Aug. 5, 1958 |
| 2,897,267 | Prince | July 28, 1959 |
| 2,897,481 | Shepard | July 28, 1959 |

OTHER REFERENCES

"Magnetostrictive Sonic Delay Line" (Epstein et al.), Review of Scientific Instruments, vol. 24, Issue 3, pp. 231, 232, March 1953.